United States Patent
Lavoie et al.

(10) Patent No.: US 9,981,690 B2
(45) Date of Patent: May 29, 2018

(54) TARGET-BASED TRAILER BACKUP COLLISION MITIGATION

(71) Applicant: Ford Global Technologies, LLC, Dearborn, MI (US)

(72) Inventors: Erick Michael Lavoie, Dearborn, MI (US); Joseph M. Raad, Farmington, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 15/097,360

(22) Filed: Apr. 13, 2016

(65) Prior Publication Data

US 2017/0297619 A1  Oct. 19, 2017

(51) Int. Cl.
*B62D 13/06*  (2006.01)
*B62D 6/00*  (2006.01)
*B62D 15/02*  (2006.01)

(52) U.S. Cl.
CPC ............ *B62D 13/06* (2013.01); *B62D 6/002* (2013.01); *B62D 15/023* (2013.01); *B62D 15/024* (2013.01); *B62D 15/027* (2013.01)

(58) Field of Classification Search
CPC ....... B62D 13/06; B62D 15/024; B62D 6/002
See application file for complete search history.

(56) References Cited

U.S. PATENT DOCUMENTS

| 3,944,972 A | 3/1976 | Chandler |
| 4,320,267 A | 3/1982 | Greve et al. |
| 4,518,044 A | 5/1985 | Wiegardt et al. |
| 4,848,499 A | 7/1989 | Martinet et al. |
| 4,947,097 A | 8/1990 | Tao |
| 5,261,495 A | 11/1993 | Szymczak |
| 5,270,689 A | 12/1993 | Hermann |
| 5,313,389 A | 5/1994 | Yasui |
| 5,359,165 A | 10/1994 | Leveque et al. |
| 5,430,261 A | 7/1995 | Malone |
| 5,436,413 A | 7/1995 | Katakami |

(Continued)

FOREIGN PATENT DOCUMENTS

| DE | 3923676 A1 | 1/1991 |
| DE | 3931518 A1 | 4/1991 |

(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Mussa A Shaawat
*Assistant Examiner* — Michael V Kerrigan
(74) *Attorney, Agent, or Firm* — Frank MacKenzie; Price Heneveld LLP

(57) ABSTRACT

A backup assist system for a vehicle and trailer combination includes a vehicle steering system, a camera generating images of the trailer, and a controller. The controller processes sequential images the trailer, selects a baseline image, and determines a collision angle based on a location of a feature of the trailer in the baseline image. The controller further controls the steering system to maintain a hitch angle below a lesser of a maximum controllable angle and the collision angle.

20 Claims, 13 Drawing Sheets

(56) References Cited

U.S. PATENT DOCUMENTS

| | | | |
|---|---|---|---|
| 5,957,232 | A | 9/1999 | Shimizu et al. |
| 6,389,342 | B1 | 5/2002 | Kanda |
| 6,601,386 | B1 | 8/2003 | Hori et al. |
| 6,636,197 | B1 | 10/2003 | Goldenberg et al. |
| 6,750,406 | B2 | 6/2004 | Komatsu et al. |
| 7,038,667 | B1 | 5/2006 | Vassallo et al. |
| 7,085,634 | B2 | 8/2006 | Endo et al. |
| 7,191,865 | B2 | 3/2007 | Spark |
| 7,225,891 | B2 | 6/2007 | Gehring et al. |
| 7,255,061 | B2 | 8/2007 | Denton |
| 7,309,075 | B2 | 12/2007 | Ramsey et al. |
| 7,310,084 | B2 | 12/2007 | Shitanaka et al. |
| 7,315,299 | B2 | 1/2008 | Sunda et al. |
| 7,436,298 | B2 | 10/2008 | Yuasa et al. |
| 7,550,686 | B2 | 6/2009 | Girke et al. |
| 7,827,917 | B1 | 11/2010 | Henderson |
| 7,837,004 | B2 | 11/2010 | Yasuda |
| 8,036,792 | B2 | 10/2011 | Dechamp |
| 8,138,865 | B2 | 3/2012 | North et al. |
| 8,519,948 | B2 | 8/2013 | Cruz-Hernandez et al. |
| 8,755,984 | B2 | 6/2014 | Rupp et al. |
| 8,786,417 | B2 | 7/2014 | Holmen et al. |
| 8,798,860 | B2 | 8/2014 | Dechamp |
| 8,825,328 | B2 | 9/2014 | Rupp et al. |
| 8,909,426 | B2 | 12/2014 | Rhode et al. |
| 8,930,140 | B2 | 1/2015 | Trombley et al. |
| 8,972,109 | B2 | 3/2015 | Lavoie et al. |
| 9,033,284 | B2 | 5/2015 | Van Staagen |
| 9,102,271 | B2 | 8/2015 | Trombley et al. |
| 9,108,598 | B2 | 8/2015 | Headley |
| 9,132,856 | B2 | 9/2015 | Shepard |
| 9,164,955 | B2 | 10/2015 | Lavoie et al. |
| 9,187,124 | B2 | 11/2015 | Trombley et al. |
| 9,238,483 | B2 | 1/2016 | Hafner et al. |
| 9,248,858 | B2 | 2/2016 | Lavoie et al. |
| 9,315,212 | B1 | 4/2016 | Kyrtsos et al. |
| 9,321,483 | B2 | 4/2016 | Headley |
| 9,335,162 | B2 | 5/2016 | Kyrtsos et al. |
| 9,340,228 | B2 | 5/2016 | Xu et al. |
| 9,352,777 | B2 | 5/2016 | Lavoie et al. |
| 9,434,414 | B2 * | 9/2016 | Lavoie .................. B62D 13/06 |
| 9,522,699 | B2 * | 12/2016 | Raad ..................... B62D 13/06 |
| 2004/0093139 | A1 | 5/2004 | Wildey et al. |
| 2004/0189595 | A1 | 9/2004 | Yuasa et al. |
| 2005/0000738 | A1 | 1/2005 | Gehring et al. |
| 2006/0092129 | A1 | 5/2006 | Choquet et al. |
| 2007/0198190 | A1 | 8/2007 | Bauer et al. |
| 2008/0030361 | A1 | 2/2008 | Peissner et al. |
| 2008/0312792 | A1 | 12/2008 | Dechamp |
| 2009/0101429 | A1 | 4/2009 | Williams |
| 2009/0306854 | A1 | 12/2009 | Dechamp |
| 2010/0063670 | A1 | 3/2010 | Brzezinski et al. |
| 2010/0152989 | A1 | 6/2010 | Smith et al. |
| 2010/0222964 | A1 | 9/2010 | Dechamp |
| 2011/0149077 | A1 | 6/2011 | Robert |
| 2011/0160956 | A1 | 6/2011 | Chung et al. |
| 2012/0030626 | A1 | 2/2012 | Hopkins et al. |
| 2012/0087480 | A1 | 4/2012 | Yang et al. |
| 2012/0271512 | A1 | 10/2012 | Rupp et al. |
| 2012/0271514 | A1 | 10/2012 | Lavoie et al. |
| 2012/0271515 | A1 | 10/2012 | Rhode et al. |
| 2012/0271522 | A1 | 10/2012 | Rupp et al. |
| 2013/0006472 | A1 | 1/2013 | McClain et al. |
| 2013/0024064 | A1 | 1/2013 | Shepard |
| 2013/0158803 | A1 | 6/2013 | Headley |
| 2013/0158863 | A1 | 6/2013 | Skvarce et al. |
| 2013/0268160 | A1 | 10/2013 | Trombley et al. |
| 2014/0052337 | A1 | 2/2014 | Lavoie et al. |
| 2014/0058614 | A1 | 2/2014 | Trombley et al. |
| 2014/0058622 | A1 | 2/2014 | Trombley et al. |
| 2014/0058655 | A1 | 2/2014 | Trombley et al. |
| 2014/0058668 | A1 | 2/2014 | Trombley et al. |
| 2014/0088797 | A1 | 3/2014 | McClain et al. |
| 2014/0156148 | A1 | 6/2014 | Kikuchi |
| 2014/0160276 | A1 | 6/2014 | Pliefke et al. |
| 2014/0172232 | A1 | 6/2014 | Rupp et al. |
| 2014/0188344 | A1 | 7/2014 | Lavoie |
| 2014/0188346 | A1 | 7/2014 | Lavoie |
| 2014/0210456 | A1 | 7/2014 | Crossman |
| 2014/0218506 | A1 | 8/2014 | Trombley et al. |
| 2014/0218522 | A1 | 8/2014 | Lavoie et al. |
| 2014/0222288 | A1 | 8/2014 | Lavoie et al. |
| 2014/0236532 | A1 | 8/2014 | Trombley et al. |
| 2014/0249691 | A1 | 9/2014 | Hafner et al. |
| 2014/0267688 | A1 | 9/2014 | Aich et al. |
| 2014/0267689 | A1 | 9/2014 | Lavoie |
| 2014/0277942 | A1 | 9/2014 | Kyrtsos et al. |
| 2014/0297128 | A1 | 10/2014 | Lavoie et al. |
| 2014/0297129 | A1 | 10/2014 | Lavoie et al. |
| 2014/0303847 | A1 | 10/2014 | Lavoie |
| 2014/0309888 | A1 | 10/2014 | Smit et al. |
| 2014/0324295 | A1 | 10/2014 | Lavoie |
| 2014/0343795 | A1 | 11/2014 | Lavoie |
| 2014/0379217 | A1 | 12/2014 | Rupp et al. |
| 2015/0057903 | A1 | 2/2015 | Rhode et al. |
| 2015/0066296 | A1 | 3/2015 | Trombley et al. |
| 2015/0070161 | A1 | 3/2015 | Mizuno et al. |
| 2015/0120141 | A1 | 4/2015 | Lavoie et al. |
| 2015/0134183 | A1 | 5/2015 | Lavoie et al. |
| 2015/0138340 | A1 | 5/2015 | Lavoie |
| 2015/0158527 | A1 | 6/2015 | Hafner et al. |
| 2015/0203156 | A1 | 7/2015 | Hafner et al. |
| 2015/0210317 | A1 | 7/2015 | Hafner et al. |
| 2015/0217693 | A1 | 8/2015 | Pliefke et al. |
| 2016/0039456 | A1 | 2/2016 | Lavoie et al. |
| 2016/0059888 | A1 | 3/2016 | Bradley et al. |
| 2016/0059889 | A1 | 3/2016 | Herzog et al. |
| 2016/0096549 | A1 | 4/2016 | Herzog et al. |
| 2016/0129939 | A1 | 5/2016 | Singh et al. |
| 2016/0280267 | A1 | 9/2016 | Lavoie et al. |
| 2016/0304122 | A1 | 10/2016 | Herzog et al. |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| DE | 102013000198 A1 | 7/2014 |
| EP | 0418653 A1 | 3/1991 |
| EP | 1653490 A1 | 5/2006 |
| EP | 1810913 A1 | 7/2007 |
| EP | 2388180 A2 | 11/2011 |
| EP | 1569073 B1 | 9/2014 |
| GB | 2398048 A | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |
| KR | 20140105199 A | 9/2014 |
| WO | 0044605 A1 | 8/2000 |

\* cited by examiner

TARGET-BASED TRAILER BACKUP COLLISION MITIGATION

FIELD OF THE INVENTION

The present invention generally relates to a trailer backup assist system for a vehicle. In particular, the system uses a target location to determine a collision angle and to monitor for a potential trailer-vehicle collision.

BACKGROUND OF THE INVENTION

Reversing a vehicle while towing a trailer is very challenging for many drivers. This is particularly true for drivers that are unskilled at backing vehicles with attached trailers which may include those that drive with a trailer on an infrequent basis (e.g., have rented a trailer, use a personal trailer on an infrequent basis, etc.). One reason for such difficulty is that backing a vehicle with an attached trailer requires steering inputs that are opposite to normal steering when backing the vehicle without a trailer attached and/or requires braking to stabilize the vehicle-trailer combination before a jackknife condition occurs. Another reason for such difficulty is that small errors in steering while backing a vehicle with an attached trailer are amplified thereby causing the trailer to depart from a desired path.

To assist the driver in steering a vehicle with a trailer attached, a trailer backup assist system needs to know the driver's intention. One common assumption with known trailer backup assist systems is that a driver of a vehicle with an attached trailer wants to backup straight and the system either implicitly or explicitly assumes a zero curvature path for the vehicle-trailer combination. Unfortunately most of the real-world use cases of backing a trailer involve a curved path and, thus, assuming a path of zero curvature would significantly limit usefulness of the system. Some known systems assume that a path is known from a map or path planner. To this end, some known trailer backup assist systems operate under a requirement that a trailer backup path is known before backing of the trailer commences such as, for example, from a map or a path-planning algorithm. Undesirably, such implementations of the trailer backup assist systems are known to have a relatively complex human machine interface (HMI) device to specify the path, obstacles and/or goal of the backup maneuver. Furthermore, such systems also require some way to determine how well the desired path is being followed and to know when the desired goal, or stopping point and orientation, has been met, using approaches such as cameras, inertial navigation, or high precision global positioning system (GPS). These requirements lead to a relatively complex and costly system.

Another reason backing a trailer can prove to be difficult is the need to control the vehicle in a manner that limits the potential for a jackknife condition to occur. A trailer has attained a jackknife condition when a hitch angle cannot be reduced (i.e., made less acute) while continuously backing up a trailer by application of a maximum steering input for the vehicle such as, for example, by moving steered front wheels of the vehicle to a maximum steered angle at a maximum rate of steering angle change. In the case of the jackknife angle being achieved, the vehicle must be pulled forward to relieve the hitch angle in order to eliminate the jackknife condition and, thus, allow the hitch angle to be controlled via manipulation of the steered wheels of the vehicle. However, in addition to the jackknife condition creating the inconvenient situation where the vehicle must be pulled forward, it can also lead to damage to the vehicle and/or trailer if certain operating conditions of the vehicle relating to its speed, engine torque, acceleration, and the like are not detected and counteracted. For example, if the vehicle is travelling at a suitably high speed in reverse and/or subjected to a suitably high longitudinal acceleration when the jackknife condition is achieved, the relative movement of the vehicle with respect to the trailer can lead to contact between the vehicle and trailer thereby damaging the trailer and/or the vehicle.

SUMMARY OF THE INVENTION

According to one aspect of the present disclosure, a backup assist system for a vehicle and trailer combination includes a vehicle steering system, a camera generating images of the trailer, and a controller. The controller processes sequential images the trailer, selects a baseline image, and determines a collision angle based on a location of a feature of the trailer in the baseline image. The controller further controls the steering system to maintain a hitch angle below a lesser of a maximum controllable angle and the collision angle.

According to another aspect of the present disclosure, a vehicle includes a steering system, a camera generating images of a predetermined area to a rear of the vehicle, and a system for assisting in reversing the vehicle with a trailer coupled therewith and including a controller. The system processes sequential images received from the camera, selects a baseline image of the trailer including a locating feature, determines a collision angle based on a location of the feature in the baseline image, controls the steering system to maintain a hitch angle below a lesser of a maximum controllable angle and the collision angle.

According to another aspect of the present disclosure, a method for assisting a vehicle in reversing a trailer includes selecting a baseline image from a plurality of sequential images received from a camera mounted to the vehicle, determining a trailer collision angle based on a location of a target on the trailer in the baseline image, and controls a steering system of the vehicle to maintain a trailer hitch angle below a lesser of a maximum controllable angle and the collision angle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
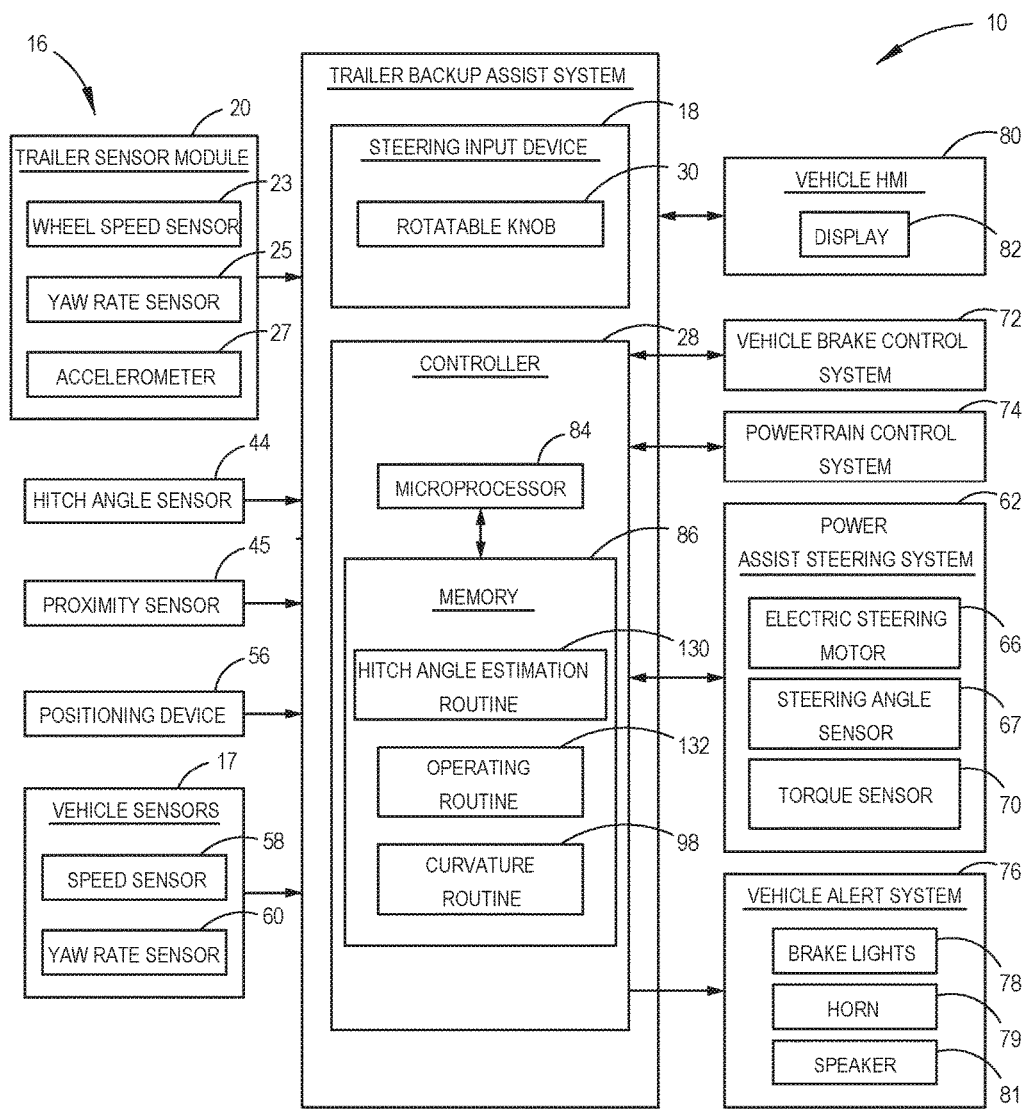
FIG. 1 is a is a block diagram illustrating one embodiment of the trailer backup assist system having a steering input device, a curvature controller, and a trailer braking system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a backup assist system for a vehicle 14 and trailer 12 combination. System 10 includes a vehicle steering system 62, a camera 46 generating images of the trailer 12, and a controller 28. The controller 28 processes sequential images of the trailer 12 generated by the camera 46, selects a baseline image of the trailer 12, and determines a collision angle γ(c) based on a location of a feature (such as trailer target 52) of the trailer 12 in the baseline image. The controller 28 further controls the steering system 62 to maintain a hitch angle γ below a lesser of a maximum controllable angle 65 (max) and the collision angle γ(c).

With respect to the general operation of the trailer backup assist system 10, as illustrated in the system diagram of FIG. 1, a steering input device 18 may be provided, such as a rotatable knob 30, for a driver to provide the desired curvature 26 (FIG. 7) of the trailer 12. As such, the steering input device 18 may be operable between a plurality of selections, such as successive rotated positions of a knob 30, that each provide an incremental change to the desired curvature 26 of the trailer 12. With reference to the embodiment of the trailer backup assist system 10 shown in FIG. 1, the trailer backup assist system 10 receives vehicle and trailer status-related information from various sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, a hitch angle sensor 44, a proximity sensor 45, and other vehicle sensors and devices may provide sensor signals or other information, such as sequential images of the trailer 12, that the controller of the trailer backup assist system 10 may process with various routines to determine an indicator of the hitch angle γ, such as a range of hitch angles.

As further shown in FIG. 1, one embodiment of the trailer backup assist system 10 is in communication with a power assist steering system 62 of the vehicle 14 to operate the steered wheels 64 (FIG. 2) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering ("EPAS") system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel (FIG. 1). However, in the illustrated embodiment, the steering wheel of the vehicle 14 is mechanically coupled with the steered wheels 64 of the vehicle 14, such that the steering wheel moves in concert with steered wheels 64, preventing manual intervention with the steering wheel during autonomous steering. More specifically, a torque sensor 70 is provided on the power assist steering system 62 that senses torque on the steering wheel that is not expected from autonomous control of the steering wheel and therefore indicative of manual intervention, whereby the trailer backup assist system 10 may alert the driver to discontinue manual intervention with the steering wheel and/or discontinue autonomous steering.

In alternative embodiments, some vehicles have a power assist steering system 62 that allows a steering wheel to be partially decoupled from movement of the steered wheels 64 of such a vehicle. Accordingly, the steering wheel can be rotated independent of the manner in which the power assist steering system 62 of the vehicle controls the steered wheels 64 (e.g., autonomous steering as commanded by the trailer backup assist system 10). As such, in these types of vehicles where the steering wheel can be selectively decoupled from the steered wheels 64 to allow independent operation thereof, the steering wheel may be used as a steering input device 18 for the trailer backup assist system 10, as disclosed in greater detail herein.

With continued reference to FIG. 1, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 1, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. The trailer backup assist system 10 can, further, provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions, as described further below. Examples of unacceptable trailer backup conditions include, but are not limited to, a vehicle 14 over-speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife (also referred to as a trailer-vehicle collision) limitation (defined by an angular displacement limit relative to the vehicle 14 and the trailer 12), and the like, as also described further below. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 1, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 1, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 1, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30.

In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device 94, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 1, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 2:
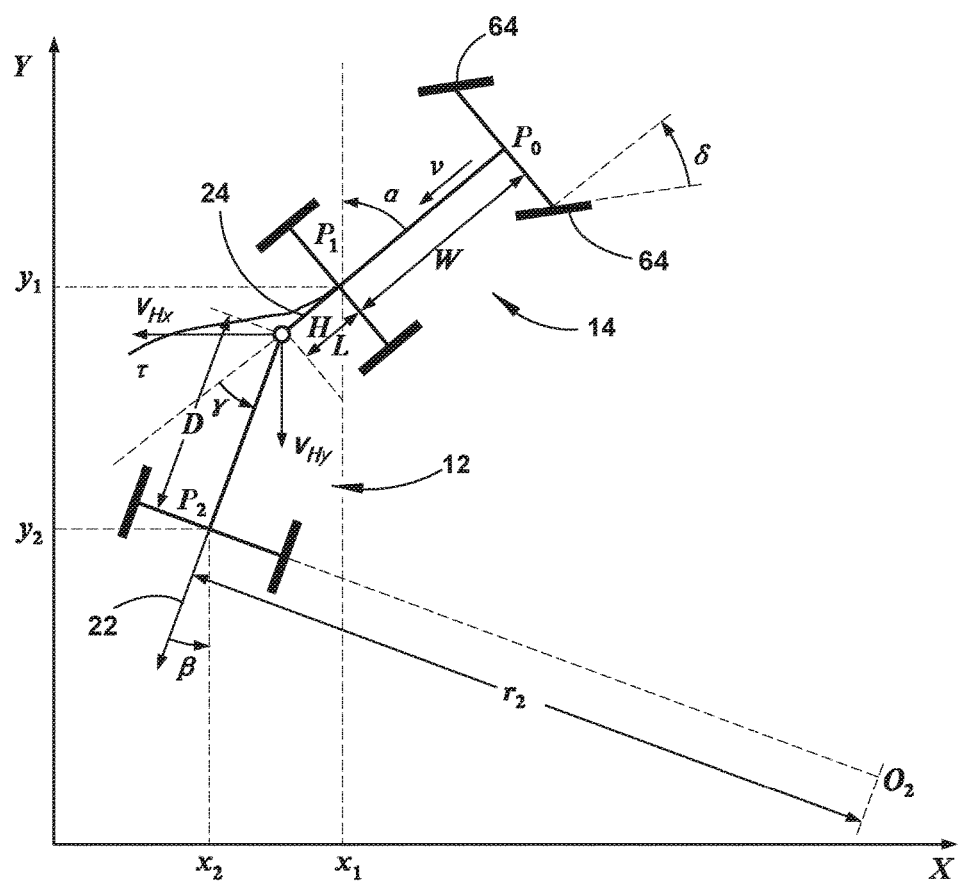
FIG. 2 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 2, we now turn to a discussion of vehicle and trailer information and parameters used to calculate a kinematic model or relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 2, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;
$\gamma$: hitch angle ($\gamma = \beta - \alpha$);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

In one example, a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma + L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

Additionally, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 3:
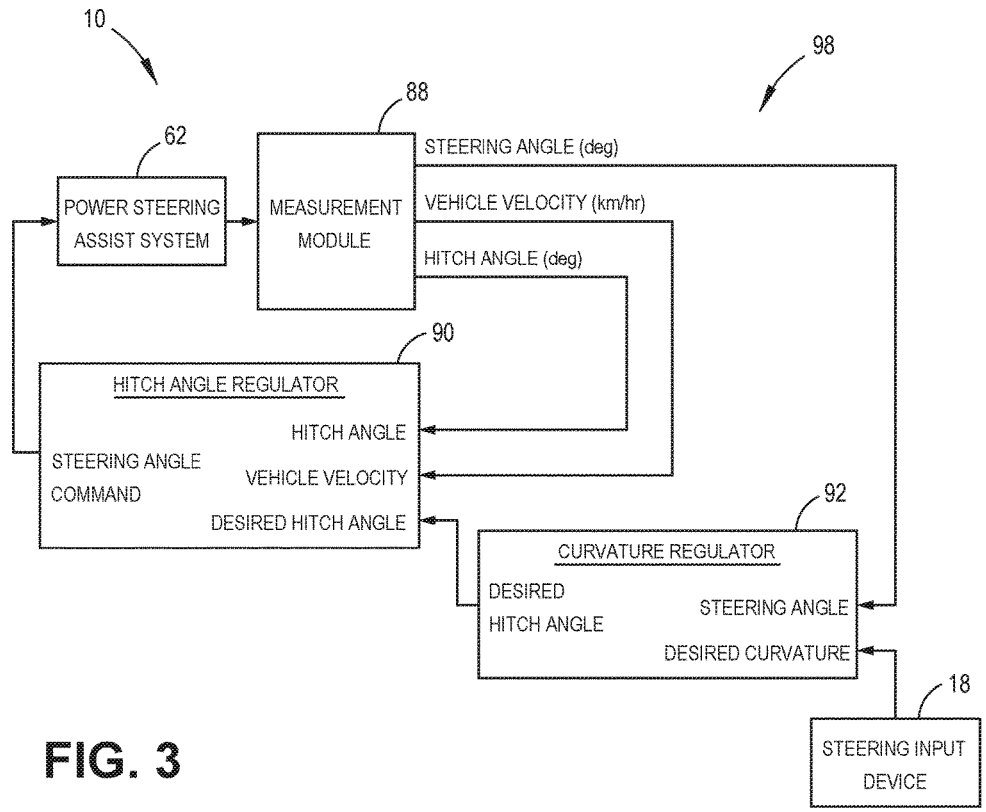
FIG. 3 is a schematic block diagram illustrating portions of a curvature controller, according to an additional embodiment, and other components of the trailer backup assist system, according to such an embodiment.

Yet another example of the curvature routine 98 of the trailer backup assist system 10 is illustrated in FIG. 3, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 4:
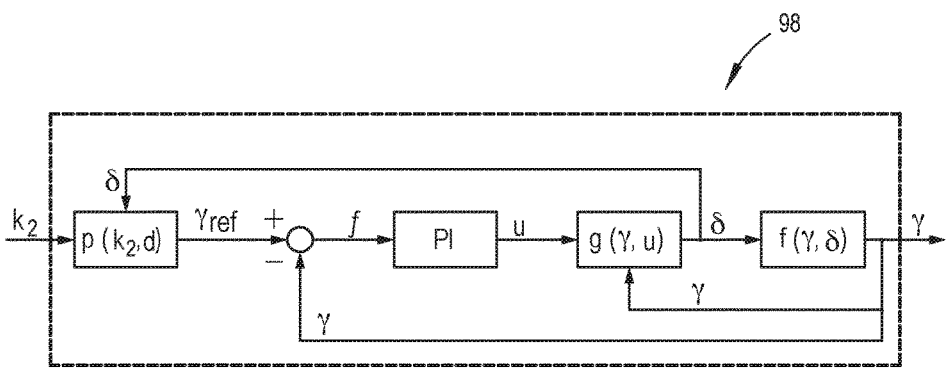
FIG. 4 is schematic block diagram of the curvature controller of FIG. 4, showing the feedback architecture and signal flow of the curvature controller, according to such an embodiment.

As also shown in FIG. 4, the curvature routine 98 shown in FIG. 3 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

Figure 5:
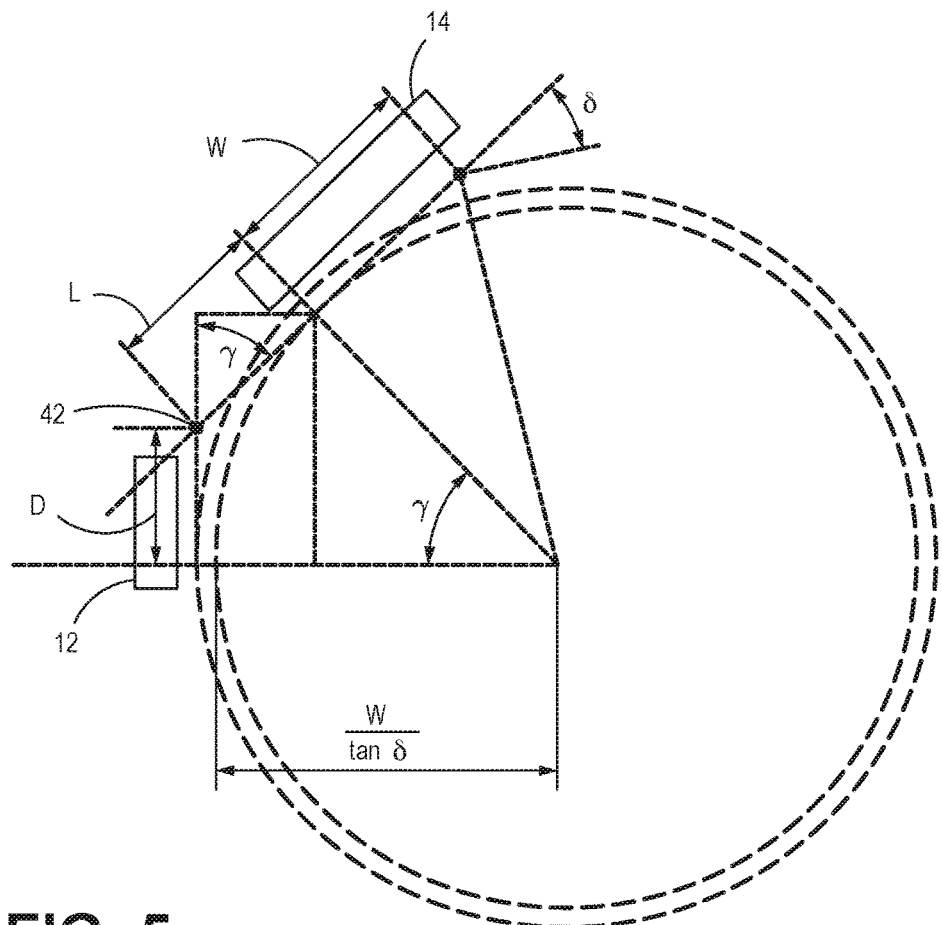
FIG. 5 is a schematic diagram showing a relationship between a hitch angle and a steering angle of the vehicle as it relates to curvature of the trailer and a jackknife angle.

With further reference to FIG. 5, the output hitch angle of $p(\kappa_2, \delta)$ is provided as the reference signal, $\gamma_{ref}$, for the remainder of the control system, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, g(u, γ, v), is implemented with a proportional integral (PI) controller, whereby the integral portion substantially eliminates steady-state tracking error. More specifically, the control system illustrated in FIG. 4 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Referring now to FIG. 5, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle γ(j) refers to a hitch angle γ that, while backing, cannot be overcome by the maximum steering input for a vehicle such as, for example, the steered front wheels of the vehicle 14 being moved to a maximum steered angle δ at a maximum rate of steering angle change. The jackknife angle γ(j) is a function of a maximum wheel angle for the steered wheels 64 of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can also be used to determine a jackknife angle for the vehicle-trailer combination. Accordingly, with reference to FIGS. 2 and 5, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan\delta_{max} = \frac{W\sin\gamma_{max}}{D + L\cos\gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\bar{\gamma} = \frac{-b \pm \sqrt{b^2 - 4\,ac}}{2a}$$

where,
$a = L^2 \tan^2 \delta(max) + W^2$;
$b = 2\,LD \tan^2 \delta(max)$; and
$c = D^2 \tan^2 \delta(max) - W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering electronic power assist system ("EPAS") controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel of the vehicle 14 due to the power assist steering system 62 being directly coupled to the steering wheel. Accordingly, the steering input device 18 of the trailer backup assist system 10 may be used for inputting a desired curvature 26 of the trailer 12, thereby decoupling such commands from being made at the steering wheel of the vehicle 14. However, additional embodiments of the trailer backup assist system 10 may have the capability to selectively decouple the steering wheel from movement of steerable wheels of the vehicle 14, thereby allowing the steering wheel to be used for commanding changes in the desired curvature 26 of a trailer 12 or otherwise selecting a desired backing path during such trailer backup assist.

Figure 6:
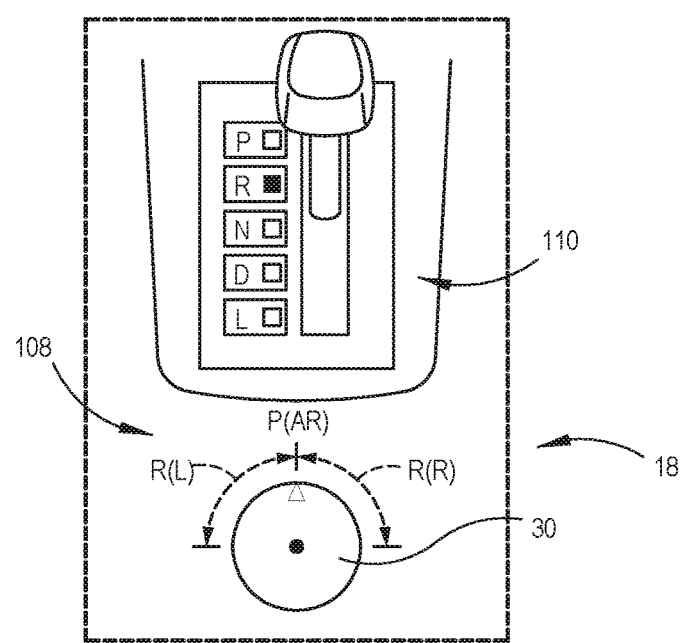
FIG. 6 is a plan view of a steering input device having a rotatable knob for operating the trailer backup assist system, according to one embodiment.

Referring now to FIG. 6, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 7:
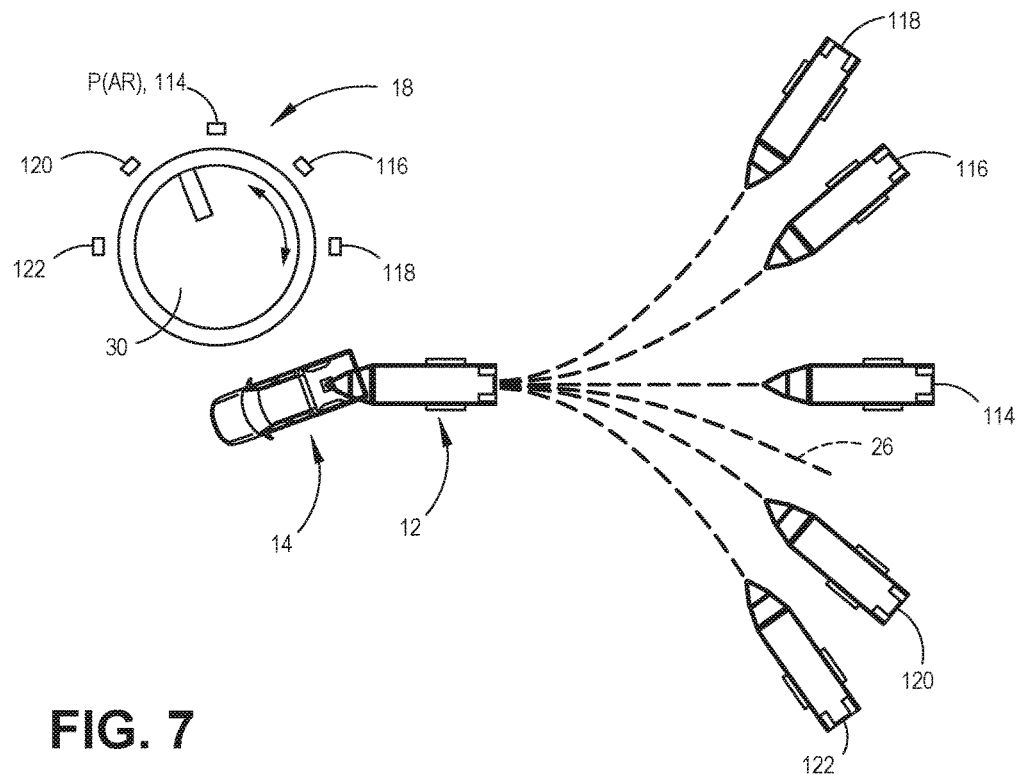
FIG. 7 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 6 and 7, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path 114 (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 7, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 8:
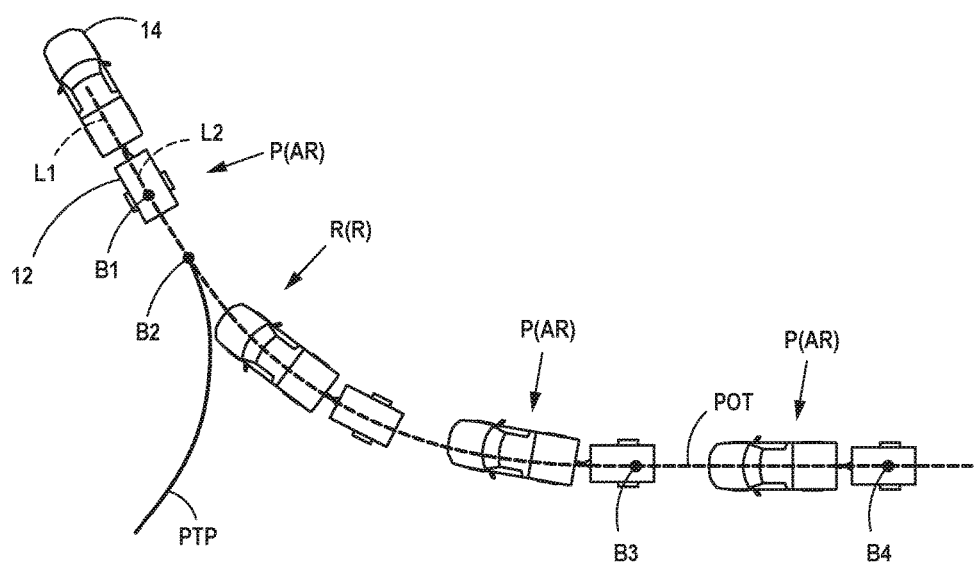
FIG. 8 is a schematic diagram showing a backup sequence of a vehicle and a trailer implementing various curvature selections with the trailer backup assist system, according to one embodiment.

Referring to FIG. 8, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 8, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 9:
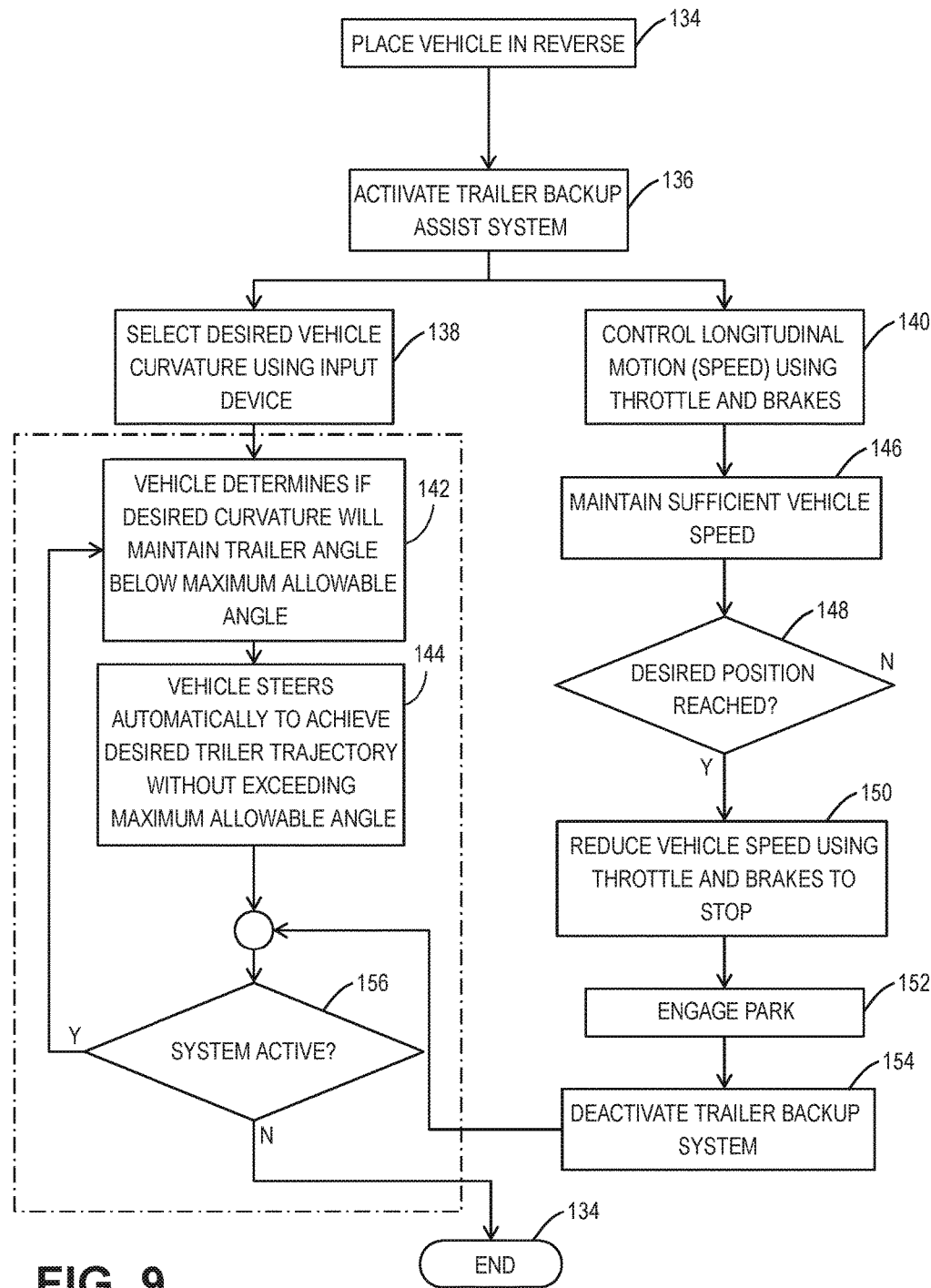
FIG. 9 is a flow diagram showing operation of one aspect of a trailer backup assist system.

With reference to FIG. 9, a method of operating one embodiment of the trailer backup assist system 10 is illustrated and includes both actions carried out by the driver of vehicle 14 as well as by system 10, which is shown, generally, as one embodiment of the operating routine 132 (FIG. 1). At step 134, the method is initiated by the driver placing the vehicle in reverse (such as after traversing the pull-through path (PTP) shown in FIG. 8) and, subsequently activating the trailer backup assist system 10. It is contemplated that this may be done in a variety of ways, such a making a selection on the display 82 of the vehicle HMI 80. Once system 10 is activated, the driver, in step 138, selects the desired vehicle curvature using an input device, such as knob 30, as discussed above with respect to FIGS. 6 and 7, above, while simultaneously controlling the longitudinal motion (i.e. speed) of vehicle 14 using the powertrain control system 74 and brakes 72 in step 140. In general, system 10 executes operating routing 132 to determine if the desired curvature can be safely executed in step 142, which, in an embodiment, may mean that the desired curvature will maintain the hitch angle γ below a determined maximum hitch angle γ(max) (which may be jackknife angle γ(j), for example, or a collision angle γ(c), ad discussed further below). As discussed further below, system 10 causes vehicle 14 to steer automatically, such as by control of EPAS system 62, to implement either the desired curvature or a modified curvature determined to be appropriate for preventing a jackknife condition, which may be determined according to the process described above with respect to FIG. 5.

As mentioned, while system 10 is causing vehicle 14 to automatically steer to maintain an appropriate curvature, the driver maintains the general responsibility for controlling the longitudinal motion of vehicle 14 using the powertrain control system 74 and brakes 72 (FIG. 1). Initially, doing so causes vehicle 14 to begin rearward motion. As vehicle 14 accelerates, it is generally the responsibility of the driver to maintain sufficient vehicle speed in step 146 until the desired position is reached (step 148) based on the curvature along which system 10 steers vehicle 14. Upon vehicle 14 reaching the desired location, the driver slows vehicle 14 by reducing throttle position and applying brake torque in step 150 before placing vehicle 14 in park and deactivating system 10, at which point system 10 relinquishes control of EPAS 62 (step 150) and the process ends in step 152.

As noted above, however, the speed at which vehicle 14 travels while system 10 executes operating routine 132 can affect the ability of system 10 to avoid a jackknife condition or other adverse condition, including a trailer-vehicle collision. In particular, at higher vehicle speeds, the dynamics of the yaw rate of trailer 12 with respect to that of vehicle 14 and, accordingly, hitch angle γ may occur at a rate that is too fast for system 10 to react to avoid a hitch angle γ increase to or beyond the determined maximum hitch angle γ(max), as explained above. Accordingly, as discussed above, it may be desirable for system 10 to be able to determine if the speed of vehicle 14 is at or is approaching a threshold at which system 10 may be unable to reliably control hitch angle γ and to act to slow vehicle 14, if necessary. As system 10 is configured such that the driver maintains general control over the speed of vehicle 14 while routine 132 is being carried out, further intervention by system 10 in the form of warning the driver of an overspeed condition or, if necessary, deactivating system 10 itself may be desirable. An example of a control scheme for carrying out such intervention in response to an overspeed condition or the like is described further in co-pending, commonly-assigned U.S. patent application Ser. No. 14/678,025, filed on Apr. 3, 2015, entitled "TRAILER CURVATURE CONTROL AND MODE MANAGEMENT WITH POWERTRAIN AND BRAKE SUPPORT," the entire disclosure of which is hereby incorporated by reference herein.

Figure 10A:
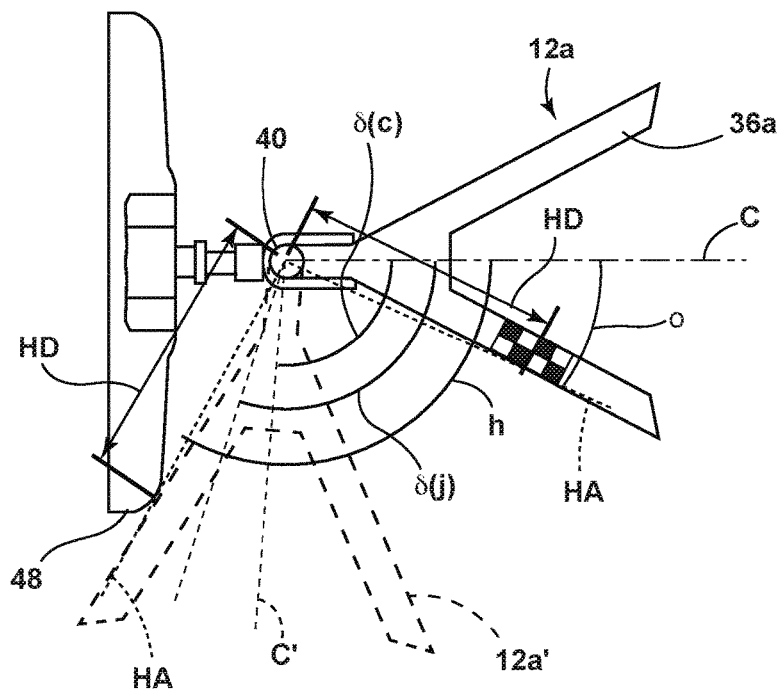
FIGS. 10A and 10B are top schematic views of trailers of various configurations in a coupled relationship with a vehicle.
Figure 10B:
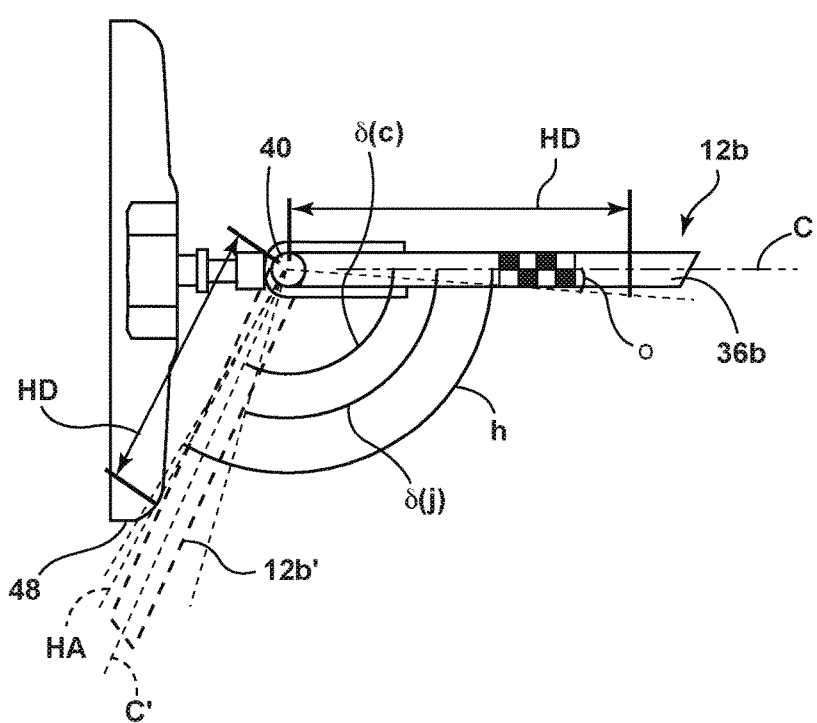

As discussed above, this and other forms of intervention can be taken by control 28 to maintain the hitch angle γ below a maximum hitch angle γ(max). In various examples, the maximum hitch angle γ(max) may correspond with a jackknife angle γ(j) or a collision angle γ(c), the angle at which the trailer 12 contacts a portion of the vehicle 14. As discussed above, the particular jackknife angle γ(j) may vary instantaneously, depending on, for example, vehicle speed, steering angle δ or the like. Further, as illustrated in FIGS. 10A and 10B, the collision angle γ(c) can vary based on the geometry of trailer 12. As shown in FIG. 10A a trailer 12a having a forked tongue 36a geometry may cause trailer 12a to make contact with the outer adjacent corner of the vehicle bumper 48 at one collision angle γ(c)a. As shown in FIG. 10B, a trailer 12b having a straight tongue 36b may make contact with the outer corner of the vehicle bumper 48 at a different collision angle γ(c)b that is greater than the collision angle γ(c)a because the overall shape of trailer 12a is wider at a point thereof that is radially aligned with the corner of the bumper 48 than the width of trailer 12b at the same point. Stated differently, a hypotenuse angle h can be characterized as the angle of a theoretical line HA between the hitch ball 40 center and the outermost point of vehicle 14 that the line intersects and a second line extending straight back from hitch ball 40. Accordingly, hypotenuse angle h can represent the maximum achievable collision angle based on the geometry of vehicle 14, including the drawbar length L. A trailer offset angle o can be defined between another theoretical line C extending from hitch ball center 40 to an outermost portion of trailer 12 at a distance HL equal to the distance between hitch ball center 40 and the outermost portion of vehicle 14 adjacent thereto. In the illustrated example, the offset angle o of trailer 12a is greater than the offset angle o of trailer 12b.

As further illustrated in FIGS. 10A and 10B, in a particular illustrated instance, a jackknife angle γ(j) may be greater than the collision angle γ(c)a of trailer 12a, but less than the collision angle γ(c)b of trailer 12b. Accordingly, in the illustrated instance, and other similar instances under similar conditions, trailer 12a can reach collision angle γ(c)a before trailer 12a reaches the jackknife angle γ(j), making the collision angle γ(c)a the effective maximum hitch angle γ(max). By contrast, in the same instance, trailer 12b would reach the jackknife angle γ(j) before reaching the collision angle γ(c)b, making the jackknife angle the maximum hitch angle γ(max). Accordingly, controller 28 can be configured to intervene, such as by taking one of the various actions described above, when the instantaneous hitch angle γ reaches the lesser (i.e. the first under an increasing hitch angle γ) of the determined jackknife angle γ(j) and the particular collision angle γ(c) associated with the trailer 12 currently coupled with vehicle 14, which may be characterized as the difference between the hypotenuse angle h and the offset angle o (i.e. h-o). In further aspects, controller 28 can add the same or particular safety angles to the values for both the jackknife angle γ(j) and the collision angle γ(c) to help maintain the maximum hitch angle γ(max) below the lesser of the jackknife angle γ(j) or the collision angle γ(c) at a distance that can help avoid the hitch angle γ actually reaching either the jackknife angle γ(j) or the collision angle γ(c).

In an embodiment, the offset angle for a particular trailer 12 (such as trailers 12a and 12b in FIGS. 10A and 10B, respectively) can be stored in memory 86 and associated with that particular trailer along with other trailer measurements (e.g., trailer length D). In one aspect, such a measurement can be obtained by user measurement in a manner similar to trailer length D in a manual parameter entry scheme. Alternatively, the offset angle o can be obtained using the hitch angle sensor 44 in the above-described form of a camera 46 configured for monitoring target 52 that is mounted on trailer 12. In particular, the hitch angle sensor 44, which operates in conjunction with target 52, provides the controller 28 with information relating to an angle between the vehicle 14 and the trailer 12 (i.e., hitch angle γ information). In an embodiment, an existing rear view camera 46 of the vehicle 14 images (i.e., visually monitors) target 52 as the trailer 12 is being backed by the vehicle 14.

Preferably, but not necessarily, the target 52 is a dedicated component (e.g., an item attached to/integral with a surface of the trailer 12 for the express purpose of being recognized by the hitch angle sensor 44).

In an example, the target 52 may include a sticker having adhesive on the bottom surface and a predetermined image pattern of a certain size and shape provided on the top surface for capture by the video camera and recognition by the image processing. The target 52 may have a rectangular shape, according to one embodiment, and may have a camera image recognizable pattern such as the checker pattern shown. The image processing may include known image pattern recognition routines for identifying a target pattern and its location on a trailer within sequential images received from camera 46 and processed by controller 28. However, it should be appreciated that other target shapes, sizes and patterns may be employed. It should further be appreciated that the target may otherwise be connected to the trailer using connectors, such as fasteners, which may connect to the trailer or to an attachment to the trailer. It should further be appreciated that the target can be attached via magnet, glued on, painted on, or any number of other suitable means.

In this manner, by determining a location of target 52 in a baseline image, the offset angle o can be determined. In fact, the controller 28 may already monitors a "raw" trailer angle based on the location of the target 52 in an instantaneous image received from camera 46 that is converted to the actual trailer angle γ using the offset angle o during the curvature routine 98. The offset angle o may be determined using a calibration operation described below.

To implement the control features discussed above with respect to operations described above, a driver must interact with the trailer backup assist system 10 to configure the system 10. The vehicle 14 is also equipped, as shown in FIG. 9, with a human machine interface (HMI) 80 to implement trailer backup assist functionality through driver interaction with the HMI 80.

Figure 11:
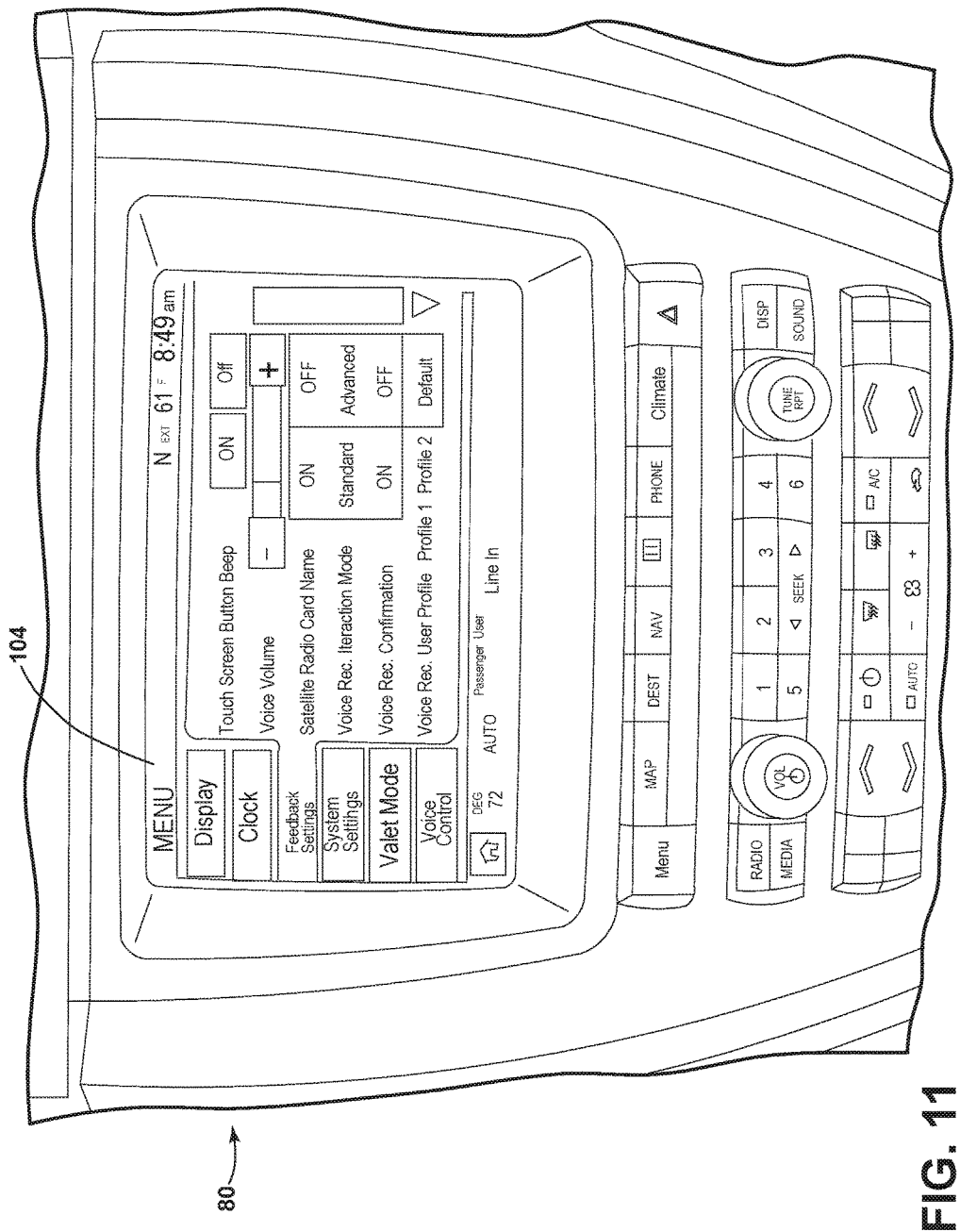
FIG. 11 shows a human machine interface (HMI) device associated with the trailer backup assist.

FIG. 11 shows an example of an HMI 80 in the vehicle 14 that a driver uses to interact with the trailer backup assist system 10. The driver is presented with multiple menus 104 (only one example menu is shown in FIG. 11) displayed by way of the HMI 80. The HMI menus 104 assist the driver through modules (shown in FIG. 12, for example) that setup 600, calibrate 700, and activate 800 the trailer backup assist system 10 so that operating routine 132 may be implemented to assist the driver with the backup of the trailer shown generally as a flow diagram in FIG. 12, and to be discussed in greater detail later herein. Each module is directed to particular elements, or features, which are used to configure the trailer backup assist system to accurately implement operating routine 98. While each module is described with reference to particular features of the disclosed subject matter, it should be noted that each module is not necessarily limited to the particular features described in the examples herein. It is possible to rearrange the modules or to replace elements or features of a module without departing from the scope of the disclosed subject matter.

Figure 12:
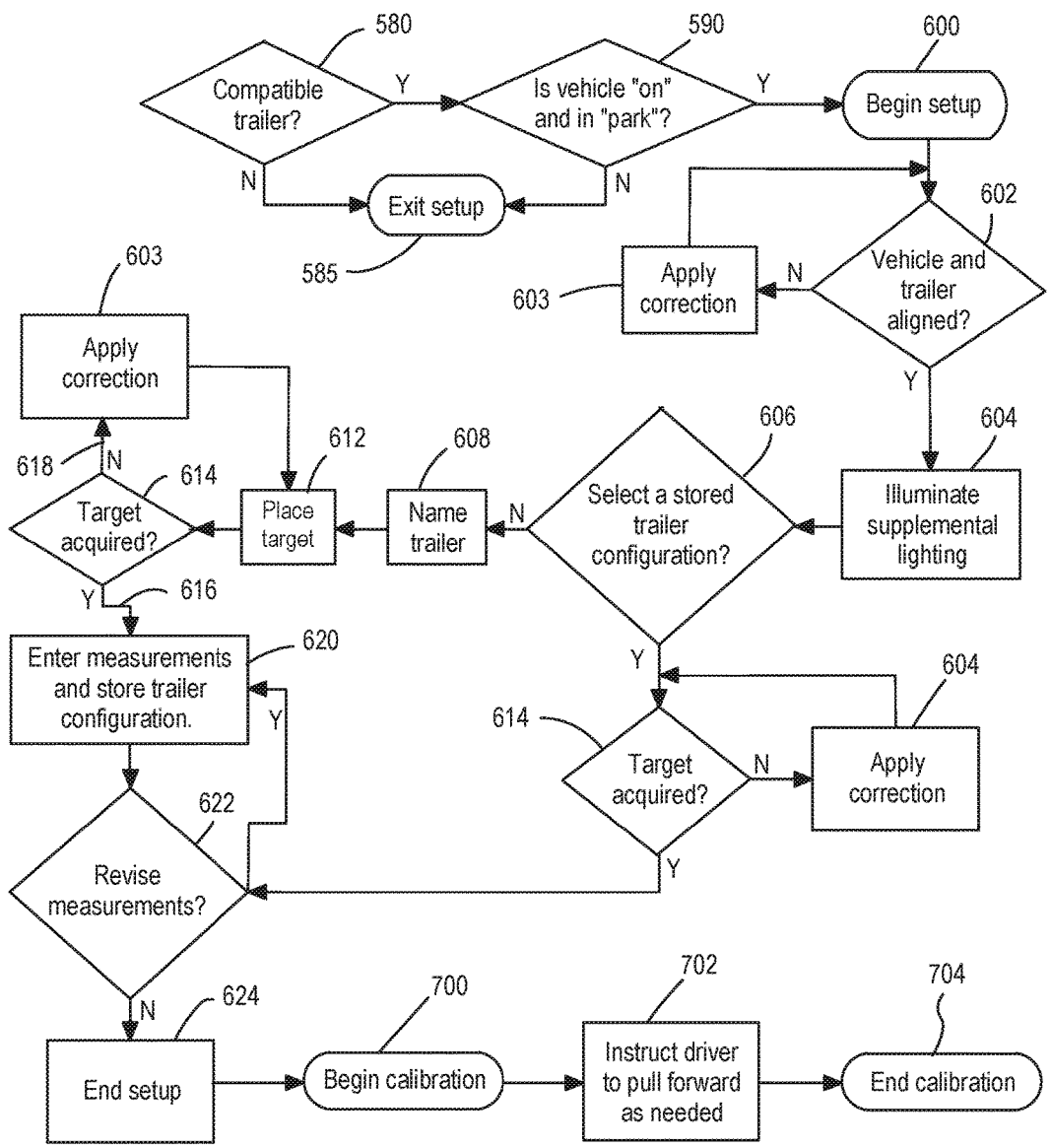
FIG. 12 shows a flow diagram associated with the trailer backup assist.

In an example the trailer backup assist system 10 will guide a driver through the steps necessary to connect a trailer and attach target 52. The driver may activate the setup by way of the backup steering input apparatus 18, for example by turning or pushing the rotary knob 30, or my merely making a selection for the trailer backup assist system from a menu on the HMI 80. Referring to FIG. 12, a driver initiates the trailer backup assist system through the trailer backup assist steering input apparatus. In the case of a rotary knob 30 (FIG. 6), the driver presses or rotates the knob 30 to initiate the trailer backup assist system. The system 10 will guide the driver through the steps of connecting 580 a compatible trailer 12. A compatible trailer is one that pivots at a single point relative to the vehicle and behind the rear axle of the backup steering input apparatus 18 or the HMI 80, the system will guide the driver to prepare the vehicle and vehicle trailer combination as necessary. The vehicle 14 should be turned "on" and the vehicle 14 should be in "park" 590. In the event the vehicle 14 is on but is traveling at a speed that is greater than a predetermined limit, for example five miles per hour, the trailer backup assist system 10 may become inactive and inaccessible to the driver. The trailer backup assist system 10 setup module 600 will not begin or will be exited 585. If the type of trailer 12 selected by the driver is a trailer 12 that is not compatible with the trailer backup assist system 10, the setup module 600 will be exited 585 or will not begin. In the event, the trailer 12 is compatible with the trailer backup assist system 10, the setup module 600 verifies that the vehicle 14 gear shift mechanism 110 is in "park." Again, in the event the vehicle is not "on" and the gear shift mechanism is not in "park," the setup module will not begin 585.

Upon connection 580 of a compatible trailer 12, the vehicle 14 being "on" 590 and the vehicle 14 being in "park" 590, the HMI 80 will present a menu 104 that has a "Towing" mode option to be selected by the driver. The driver selects "Towing" mode and a menu 104 is presented that provides a "Trailer Options" selection. The driver then selects a "Trailer Options" mode from the "Towing" menu. The driver is prompted to either "add a trailer" or "select a trailer" from a menu 104 presented on the HMI 80 and the "Setup" module 600 of the inventive subject matter has begun. For certain camera-based trailer angle detection systems, an operation 602 is performed wherein a warning menu may be presented to the driver, by way of the HMI, informing the driver that the trailer must be in a straight line, meaning there is no angle at the hitch between the vehicle and the trailer. The warning indicates that the driver may need to take corrective action, for example, pull the vehicle forward in order to align the trailer and the vehicle as required for the setup 600. A generic or static graphic may be presented by way of the HMI 80 to assist the driver in visually recognizing the alignment between the trailer 12 and the vehicle 14 that is necessary in order to properly setup and calibrate the trailer backup assist system 10. The driver applies any corrections 603 in that the driver makes any necessary adjustment he has been alerted to and indicates, by acknowledging that corrective actions have been applied 603 and that the trailer is in line with the vehicle. Other trailer angle detection systems may not need the driver to straighten the trailer during setup mode.

To aid the driver in the setup process, the reverse back lights, or any other supplemental lighting that may be available on the vehicle, are illuminated 604. In the event the trailer is a new trailer, one that has not been attached to the vehicle before or has not been previously stored in the trailer backup assist system, the driver is presented 606 with an option to either name the trailer or select a previously stored trailer configuration. Naming the trailer 608 allows the trailer to be easily identified the next time it is attached to the vehicle so that the driver does not have to repeat the setup process. The driver either enters a unique name to identify the trailer that is to be stored in the trailer backup assist system or selects a previously stored trailer configuration associated with the attached trailer. The trailer backup assist system will not allow more than one trailer to have the same name. Therefore, if a driver attempts to name a trailer using a name that has already been applied to a previously stored trailer configuration, the HMI will display a message to the driver indicating so and requesting the driver enter a different name for the trailer configuration. In the case where a previously stored trailer configuration is available and selected 610 by the driver, certain steps in the setup process may be skipped.

In the case of a first time trailer configuration for a camera-based trailer angle detection system, described above. The driver is instructed 612 to place a hitch angle target 52 on the trailer 12 that is used for calibration and hitch angle γ measurement purposes. A generic static image may be displayed on the HMI that provides direction to the driver as to placement of a target on the trailer that is used for hitch angle detection. The target placement is dependent upon the type of trailer being towed and therefore, options may be presented to the driver to aid the driver in selecting an appropriate trailer type. The static image may indicate areas that are acceptable for target placement as well as areas that are unacceptable for target placement. The static image indicating the appropriate areas for attaching the target may be an overlay of the rear view of the trailer hitch. Once the driver attaches the target to the trailer and indicates by way of the HMI that the target has been attached to the trailer the setup mode provides 614 visual feedback to the driver identifying that the target has been located, or acquired. The driver acknowledges 616, by way of the HMI, that the target has been properly identified by the trailer backup assist system. Similarly, for a previously stored trailer configuration, the trailer will already have a target placed thereon. The trailer backup assist system will acquire the target and provide 614 visual feedback to the driver confirming acquisition of the target.

In the event the target is not acquired 614 after a predetermined amount of time lapses, the driver is notified 618 of the need to reposition the target and presented with possible corrective measures that may be taken. Possible corrective measures may be presented to the driver such as cleaning the camera lens, cleaning the target, replacing the target if it has been damaged or faded, pulling the vehicle-trailer combination forward to improve lighting conditions around the camera and/or target, and moving the target to an acceptable location. The driver applies the necessary corrections 603. As mentioned above, some trailer angle detection systems may not require the driver to attach a target to the trailer during set up mode. The target and acquisition of the target are directed to camera-based trailer angle detection systems.

When the target is acquired 614 by the trailer backup assist system 10 and the driver has acknowledged 616 the acquisition, the driver may then be prompted through a series of menus to input 620 trailer measurement information that may be stored in the trailer backup assist system for a trailer configuration that is to be associated with the named trailer. The next time the same trailer is attached to the vehicle, its unique trailer configuration will already be stored and progress through the setup module will be faster or, in some cases, may be skipped entirely. Generic static images may be displayed at the HMI screen in order to assist the driver with the measurement information. Visual examples, see FIG. 13, may be provided to aid the driver in identifying the location on the vehicle, the trailer or between the vehicle and trailer that the driver is being prompted to enter. In addition, numerical limits for the driver entered measurements are set within the trailer backup assist system and may be displayed to the driver. The driver may be warned about entered measurements that exceed the numerical limits. Additionally, the measurement information requests that the driver is prompted to enter may be presented to the driver in the order that the measurements should be entered into the trailer backup assist system.

It should be noted that while measurement information is discussed above as being entered by the driver, various methods of entering measurement information may also be employed without departing from the scope of the inventive subject matter. For example, a system to automatically detect measurements using existing vehicle and trailer data including, but not limited to, vehicle speed, wheel rotation, steering wheel angle, vehicle to trailer relative angle, and a rate of change of the vehicle to trailer angle.

Figure 13:
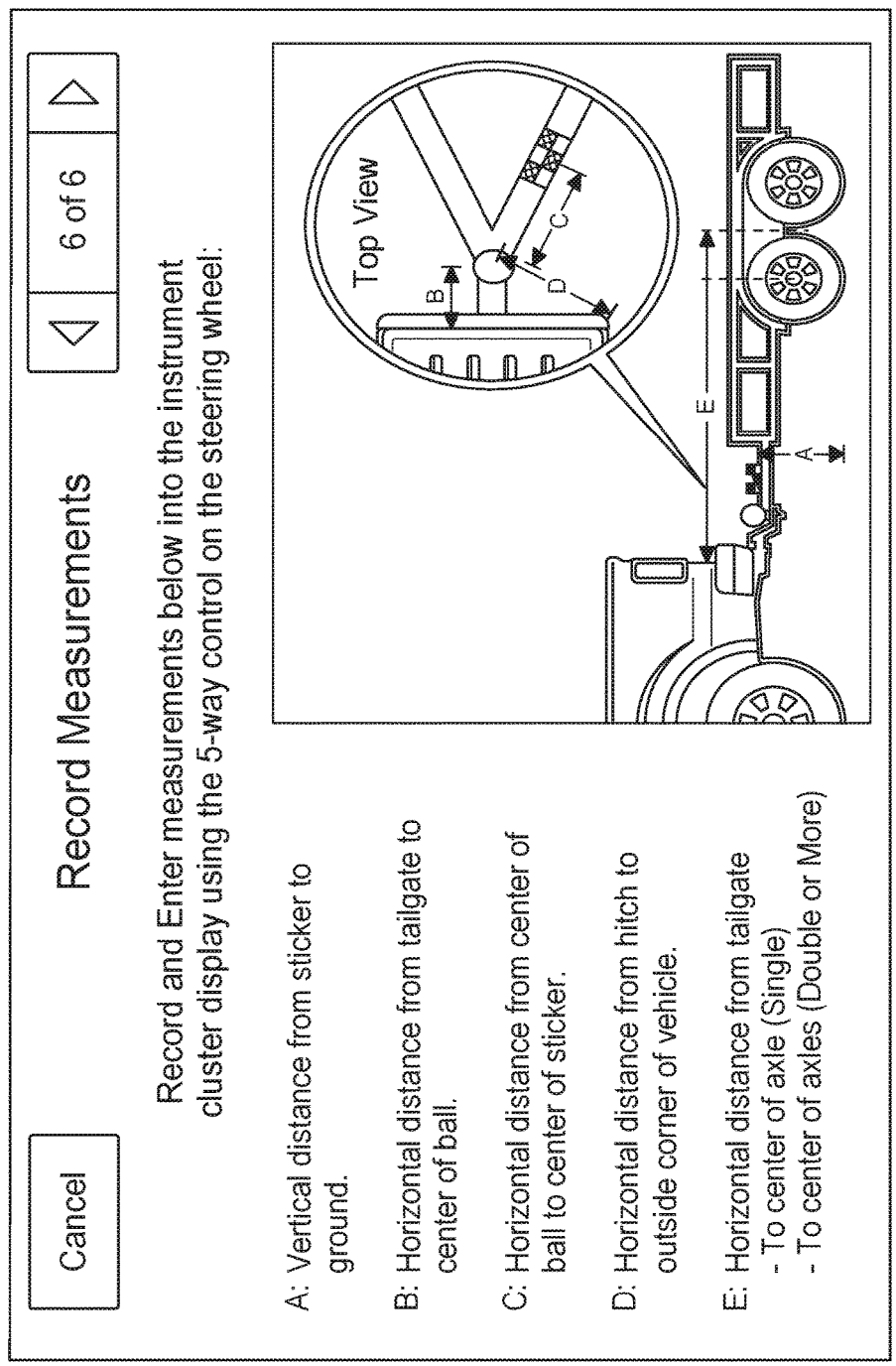
FIG. 13 shows a flow diagram of the setup module according to one embodiment.

Examples of the measurement information may include a horizontal distance from the rear of the vehicle to the center of a hitch ball, a horizontal distance from the rear of the vehicle to a center of the target, a vertical distance from the target to the ground, and a horizontal offset of the target from a centerline of the hitch ball. In the event the target is attached at other than the centerline of the hitch ball, then the trailer backup assist system must know which side of the vehicle the target is attached to, the passenger side or the driver side. A menu on the HMI may be presented for the driver to indicate passenger side or driver side for the placement of the target. The trailer backup assist system may also need to know the horizontal distance from the center of the hitch ball 40 to a center of the axle or axles of the trailer (i.e. trailer length D). The measurements may be entered in either English or metric units. Further, the driver may be asked to enter either the distance from the center of the hitch ball 40 to the adjacent outer corner of the vehicle (i.e. the outer edge of bumper 48) or from the base of the hitch (as indicated in FIG. 13). The above-mentioned hypotenuse angle h can be calculated using either of these measurements, alone or in combination with the trailer hitch length measurement. In other embodiments, the distance from the trailer hitch base to the outer corner of the bumper 48 may be known such that the hypotenuse angle can be determined using only the hitch length measurement.

The driver is presented 622 with the option to revise any of the measurements before proceeding with the setup process. Otherwise, the setup module 600 is complete 624 and the calibration module 700 begins.

The calibration module 700 is designed to calibrate the curvature control algorithm with the proper trailer measurements and calibrate the trailer backup assist system for any hitch angle offset that may be present. After completing the setup module 600, the calibration module begins 700 and the driver is instructed 702 to pull the vehicle-trailer combination straight forward until a hitch angle sensor 44 calibration is complete. The HMI may notify the driver, by way of a pop up or screen display that the vehicle-trailer combination needs to be pulled forward until calibration is complete. In an embodiment, controller 28 can look for a steady-state condition, in which the steering angle δ is approximately zero and approximately constant for a predetermined time interval. The controller 28, which processes sequential images received from camera 46 during operation of system 10, can then determine a location of target 52 in a baseline image (which may be a video image or a sequence of images over the steady-state interval for δ) taken of trailer 12 during an interval for which the steady state condition is detected. When calibration is complete, the HMI may notify 704 the driver. A value for the hitch angle offset angle o (which may be zero) is determined based on a known zero angle (i.e. extending along line C in FIGS. 10A and 10B directly rearward of vehicle 14) and the determined location of target 52 in the baseline image and is stored 706 in memory. Accordingly, hitch angle offset angle o can be accessed as necessary by the curvature control algorithm, and the calibration module 700 ends 704. Additionally, as discussed above, the offset angle o value can be used in the above-described scheme for mitigating a collision between trailer 12 and vehicle 14. Specifically, the offset angle o can be subtracted from the measured hitch angle γ by controller 28 to determine if intervention is needed to maintain the hitch angle γ below the collision angle γ(c). It is noted that this process is used instead of simply monitoring the raw trailer angle for a collision because, as illustrated in the example of FIG. 10A, a collision must also be monitored for on a side opposite the target 52, meaning that compensation for target 52 placement is still desired.

It should be noted that while hitch angle calibration is described above as may be requesting the driver pull forward information, various other methods of hitch angle calibration may also be employed without departing from the scope of the embodiment.

Upon completion of the setup module 600 and the calibration module 700, the trailer backup assist mode may be activated and may, accordingly, proceed according to the process described above with respect to FIG. 9. Upon activation of the trailer backup assist system, the steering system 62 will not accept any steering angle commands from any source other than the trailer backup assist system 10. The trailer setup 600 and calibration 700 modules must be completed and a current hitch angle must be within a predetermined operating range for the trailer backup assist system 10. As described above, if at any time during the reversing process the hitch angle γ exceeds the determined maximum hitch angle γ(max) (i.e. the lager of the determined jackknife angle γ(j) and the trailer-specific collision angle γ(c), plus any added tolerances or safety angles), the TBA will take corrective action, if possible, including reducing the throttle by way of a powertrain control system 74 or applying the brakes 72. If corrective action is not possible, system 10 may provide a warning to the driver to pull forward to reduce the hitch angle. If at any time during the reversing process the system is unable to track the hitch angle target, the driver is presented with instructions to correct the problem. If at any time the vehicle speed exceeds that predetermined activation speed, the driver is visually and audibly warned to stop or slow down.

Referring now to instructions processible by a data processing device, it will be understood from the disclosures made herein that methods, processes and/or operations adapted for carrying out trailer backup assist functionality as disclosed herein are tangibly embodied by non-transitory computer readable medium having instructions thereon that are configured for carrying out such functionality. The instructions are tangibly embodied for carrying out the method illustrated in FIG. 9, including implementation of curvature routine 98, as well as methods 600 and 700, as illustrated in FIG. 12. These and other processes disclosed and discussed above and can be further configured for limiting the potential for a jackknife condition or a trailer-vehicle collision such as, for example, by monitoring jackknife angle through use of the equations discussed in reference to FIG. 5 and/or by implementing jackknife countermeasures functionality discussed above in reference to FIG. 9, as well as by monitoring the hitch angle γ for a potential collision condition, wherein the hitch angle γ plus the offset angle o approaches the hypotenuse angle h, particularly when the collision angle is determined to be less than the jackknife angle γ(j). The instructions may be accessible by one or more data processing devices from a memory apparatus (e.g. RAM, ROM, virtual memory, hard drive memory, etc.), from an apparatus readable by a drive unit of a data processing system (e.g., a diskette, a compact disk, a tape cartridge, etc.) or both. Accordingly, embodiments of computer readable medium in accordance with the inventive subject matter include a compact disk, a hard drive, RAM or other type of storage apparatus that has imaged thereon a computer program (i.e., instructions) configured for carrying out trailer backup assist functionality in accordance with the inventive subject matter.

In a preferred embodiment of the disclosed subject matter, a trailer backup assist control module (e.g., the trailer backup assist control module 28 discussed above in reference to FIG. 1) comprises such a data processing device, such a non-transitory computer readable medium, and such instructions on the computer readable medium for carrying out trailer backup assist functionality (e.g., in accordance with the method discussed above in reference to FIG. 9) and/or the method 500 discussed above in reference to FIG. 8 and/or the methods 600 and 700 discussed above in reference to FIG. 12. To this end, the trailer backup assist control module can comprise various signal interfaces for receiving and outputting signals. For example, a jackknife enabling condition detector can include a device providing hitch angle information and hitch angle calculating logic of the trailer backup assist control module. A trailer backup assist control module 28 in the context of the inventive subject matter can be any control module of an electronic control system that provides for trailer backup assist control functionality in accordance with the disclosed subject matter. Furthermore, it is disclosed herein that such a control functionality can be implemented within a standalone control module (physically and logically) or can be implemented logically within two or more separate but interconnected control modules (e.g., of an electronic control system of a vehicle) In one example, trailer backup assist control module in accordance with the disclosed subject matter is implemented within a standalone controller unit that provides only trailer backup assist functionality. In another example, trailer backup assist functionality in accordance with the disclosed subject matter is implemented within a standalone controller unit of an electronic control system of a vehicle that provides trailer backup assist functionality as well as one or more other types of system control functionality of a vehicle (e.g., anti-lock brake system functionality, steering power assist functionality, etc.). In still another example, trailer backup assist functionality in accordance with the disclosed subject matter is implemented logically in a distributed manner whereby a plurality of control units, control modules, computers, or the like (e.g., an electronic control system) jointly carry out operations for providing such trailer backup assist functionality.

As discussed above, the vehicle trailer backup assist system 10 may utilize the target 52 placed on the trailer 12 to serve as the hitch angle sensor 44. In doing so, the trailer backup assist system may employ information acquired via image acquisition and processing of the target for use in the hitch angle sensor 44, according to one embodiment. According to other embodiments, the target may be used to identify if a connected trailer has changed, trailer connection or disconnection, and other trailer related information. The target 52 is an identifiable visual target that can be captured in an image by the video imaging camera 46 and detected and processed via image processing. According to one embodiment, the target 52 may include an adhesive target, also referred to as a sticker, that may be adhered via adhesive on one side onto the trailer 12, preferably within a target placement zone, such that the camera 46 and image processing may detect the target 52 and its location on the trailer to determine trailer related information, such as the offset angle o during the above-described calibration process 700, and hitch angle γ between the trailer 12 and the towing vehicle 14. The trailer backup assist system 10 may provide to the user one or more image(s) of the trailer target zone for proper placement of the target to assist with placement of the target 52 on the trailer 12, as described further below. Additionally, the vehicle trailer backup assist system 10 may monitor the target 52 to determine if the target 52 has been correctly placed within a desired target placement zone and provide feedback alert(s) to the user. Further, the trailer backup assist system 10 may monitor the trailer connection by monitoring the target to determine if the target has moved to determine whether the same trailer remains connected to the tow vehicle, and may initiate action in response thereto. Further, the trailer backup assist system 10 may monitor the hitch angle γ or the target to determine if the trailer may have been changed out (i.e., disconnected and replaced with another trailer), and may initiate action in response thereto.

The vehicle trailer backup assist system 10, for example, may include the hitch angle sensor 44 and a target monitor controller, which may be integrated with the functionality of controller 28 or hitch angle sensor 44 or may be a stand-alone controller in the form of a microprocessor, an application-specific integrated circuit ("ASIC") or the like. The target monitor controller can be used for monitoring the target, assisting with placement of the target, monitoring connection of the trailer, determining if the trailer has moved, and initiating certain actions, as described further in U.S. Pat. No. 9,102,271, filed on Oct. 31, 2013, entitled "TRAILER MONITORING SYSTEM AND METHOD," the entire disclosure of which is hereby incorporated by reference herein.

Figure 14:
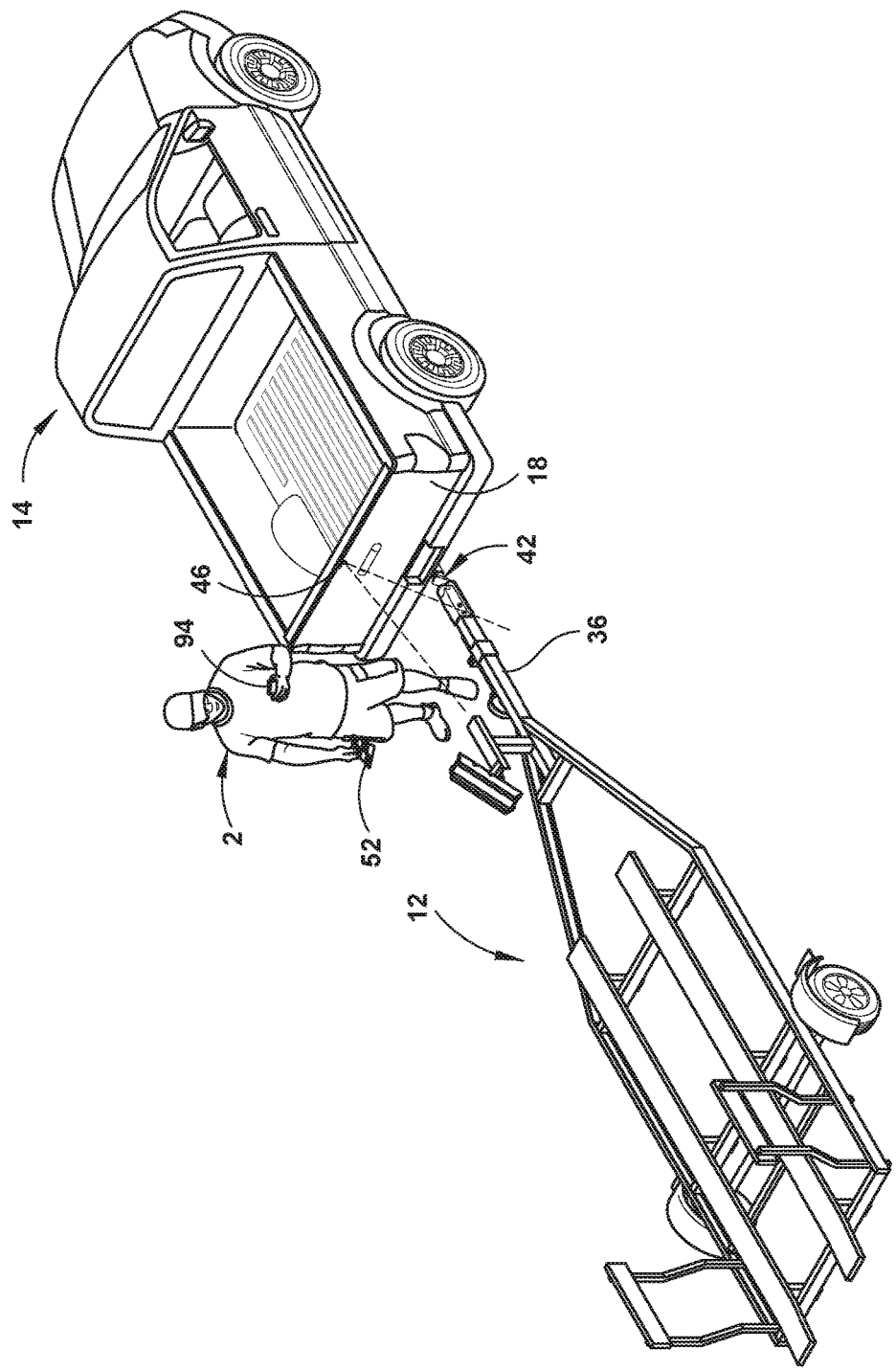
FIG. 14 is a schematic diagram illustrating user placement of the target on a trailer towed by a vehicle.
Figure 15:
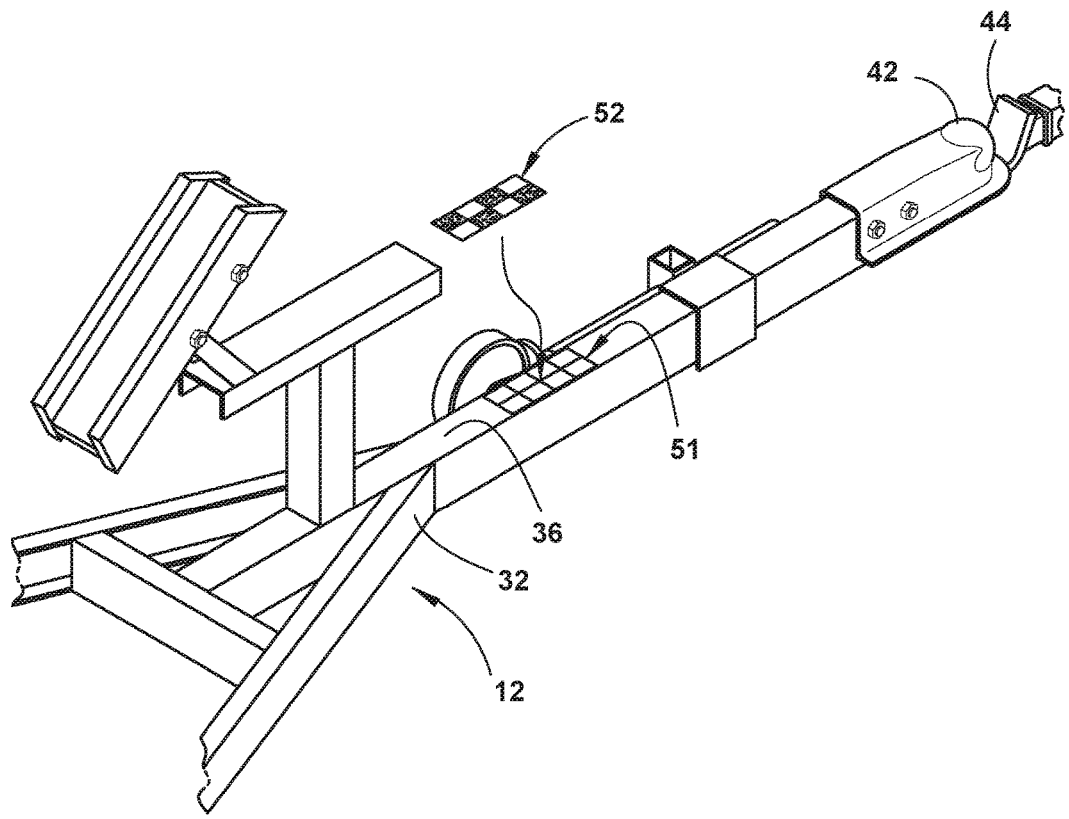
FIG. 15 is an enlarged view of the front portion of the trailer further illustrating the target placement zone in relation to the target sticker.

Referring to FIGS. 14-18, the placement of the target 52 onto trailer 12 is illustrated according to one example. In FIGS. 14 and 15, a tow vehicle 14 is shown towing a trailer 12. The trailer 12 has a trailer hitch connector in the form of a coupler assembly 42 connected to a vehicle hitch connector in the form of a receiver hitch and ball 40. The coupler assembly 42 latches onto the hitch ball 40 to provide a pivoting ball joint. The trailer 12 is shown having a frame 32 including a longitudinally extending bar or trailer tongue 36. A top horizontal surface of trailer tongue 36 is shown providing a desired target placement zone 51 for receiving the target 52. As discussed above and further below, the trailer 12 may be configured in various shapes and sizes, with which the desired target placement zone 51 for receiving the target 52 may correspond according to the collision detection scheme discussed above. The target placement zone 51 defines the desired location for placement of the target 52.

The vehicle 14 is equipped with a video imaging camera 46 shown located in an upper region of the vehicle tailgate at the rear of the vehicle 14. The video imaging camera 46 is elevated relative to the target placement zone(s) 51 and has an imaging field of view 50 and is located and oriented to capture one or more images of the trailer 12 including a region containing one or more desired target placement zone(s) 51. It should be appreciated that one or more cameras may be located at other locations on the vehicle 14 to acquire images of the trailer 12 and the target placement zone(s) 51.

In order to utilize a target on a trailer that is not currently equipped with a suitable pre-existing target, a user 2 may be instructed or directed to place the target 52 onto the trailer 12 within a desired target placement zone 51 so that the camera 46 may capture one or more images of the target 52 to determine trailer related information for the trailer backup assist system, such as hitch angle γ information for the hitch angle sensor 44. In doing so, a user 2 may be prompted by an audible or visual message on the vehicle HMI 80 or a portable device 94 to place the target 52 on the trailer 12. The vehicle HMI 80 may include visual and/or audible outputs generating instructions for proper target placement.

To allow for efficient and proper placement of the target 52 onto the trailer 12, the trailer backup assist system 10 may employ a target placement assist method or routine that is processed by the target monitor controller, as described further in the above-referenced '271 patent. The target placement assist method includes steps in which the user may connect the portable device 94 having an image display to communicate with the vehicle 14. The user 2 may connect the device electronically to the vehicle which can be achieved by way of a wireless protocol, according to one embodiment. The device 94 may be a wireless device that may communicate via Wi-Fi, BLUETOOTH® or other wireless protocol. Alternatively, the device could be connected via a wired connection. Next, the user initiates the hitch angle detection system setup which requires initiating the setup procedure for the hitch angle sensor 44. As part of this procedure, the user will be required to place a target onto the trailer of the vehicle within, for example, a target placement zone 51. The system may generate with the camera 46 one or more images of the towed trailer 12 which include a region where the desired target placement zone(s) 51 is expected to be located. There may be more than one target placement zone 51 and one zone may be preferred over another zone. The system processes the generated images and determines the desired target placement zone 51 on the trailer 12. The desired target placement zone 51 may be determined based on camera 46 location and orientation, desired distance of the target 52 from the hitch connection 42 and the physical structure of the trailer 12. The system may generate a target overlay on the one or more generated images (shown, for example, in FIG. 16). The target overlay may be a visual indication of the desired location of the target 52 within the target placement zone 51 upon which the user is instructed to place the target 52. The target overlay may include border lines marking the target placement zone 51 or other identifier. The user is then prompted by, for example, HMI 80 to place the target 52 on the trailer 12 within the target placement zone 51 with assistance from the displayed image and target overlay on the vehicle's display and/or the portable device 94.

Figure 16:
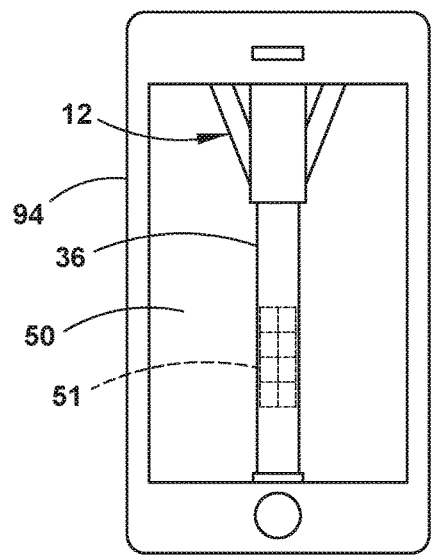
FIG. 16 is a front view of a portable device having a display illustrating the overlay of a target onto a target placement zone on the trailer.
Figure 17:
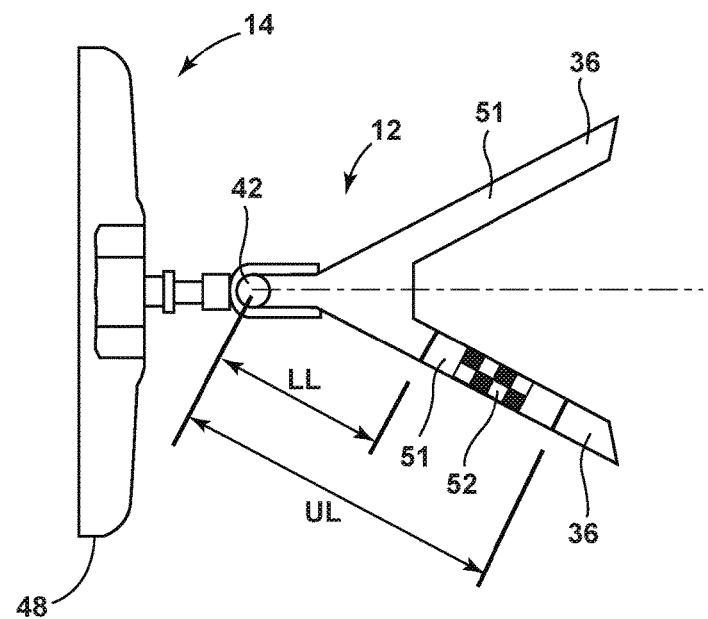
FIG. 17 is a top schematic view of a trailer coupled with a vehicle illustrating a method of placing a target on the trailer.

By using such a method, including in combination with the calibration process 700 described above with reference to FIG. 12, the target 52 can be ultimately located in an area conducive to effective use of target 52 to monitor hitch angle γ, including by determining any offset angle o due to the particular target location 51 for use in both converting a raw trailer angle to the measured trailer angle γ and in monitoring for a trailer angle γ approaching a collision angle γ(c), as discussed above. With additional reference to FIGS. 10A and 10B it is noted that the trailer 12 depicted in FIGS. 14-16 is of a similar configuration to trailer 12*b* depicted in FIG. 10B for which the offset angle is intended to be zero (but may be a small, nonzero angle due to an allowable inaccuracy in the particular placement of target 52 by user 2). As shown in FIG. 17 an alternative target placement zone 51 and correspondingly placed target 52 are illustrated that reflect the geometry of trailer 12*a* in FIG. 10A and for which the offset angle o is nonzero and is, further, significant in monitoring for a trailer-vehicle collision instance. As shown in FIG. 17, the target placement zone 51 is determined to be within a particular distance (e.g., between lower limit LL and upper limit UL) of hitch ball 40 along one side of the split trailer 12 tongue 36. In an example, the lower limit LL may be about 7 inches and the upper limit UL may be about 22 inches, although the particular values of both limits may vary. As further illustrated, multiple target placement zones 51 are identified and presented to user 2 that correspond with the multiple sides of the split trailer 12 tongue 36. Accordingly, as a part of the target placement routine 614, the particular zone 51 within target 52 is placed may be noted and stored in memory for use in trailer calibration 700.

Figure 18:
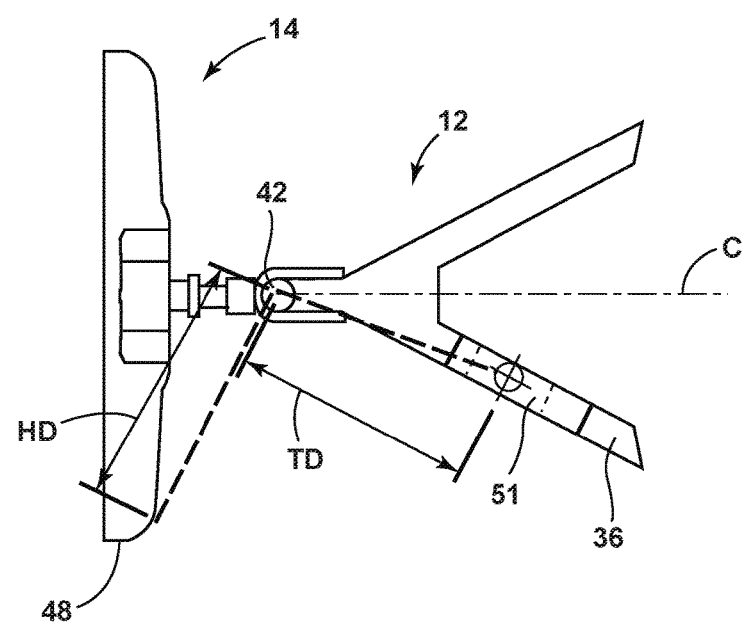
FIG. 18 is a top schematic view of a trailer coupled with a vehicle illustrating an alternative method of placing a target on the trailer.

As further shown in FIG. 18, additional steps may be taken for placement of target 52 on trailer 12 that may improve the accuracy of system 10 in determining the hypotenuse angle h and in monitoring the hitch angle γ for a potential collision condition. In such a process, the HMI 80 or device 94 can request that user 2 measure the hypotenuse distance HD (which may be entered into memory 86). Subsequently, the user 2 is directed to measure a target placement distance TD along tongue 36 (or a side thereof) that is equal to the hypotenuse distance HD. The user 2 is then directed to place target 52 on trailer 12 so that target 52 is centered at the target placement distance TD. In an instance where the trailer 12 includes a split tongue 36, the user 2 may further be directed to place target 52 at an outermost portion of the trailer 12 at the target placement distance TD. In an embodiment, where the hypotenuse distance HD is entered into memory by user 2, the HMI 80 or device 94 may present an overly of a modified target placement zone 51 on an image of trailer 12, with the overlay of the target placement zone 51 being positioned at the target placement distance TD, rather than over a larger area.

Such placement of target 52 may improve the estimate of the collision angle γ(c) obtained by system 10. Further, the ability of system 10 to monitor the hitch angle γ with respect to collision angle γ(c), as the target 52 itself moves toward and away from a potential collision location during increasing and decreasing of hitch angle γ (even when a portion of trailer 12 opposite target 52 moves toward the adjacent edge of vehicle 14). In such an instance, the collision angle γ(c) is approximately equal to the difference between the hypotenuse angle h (which may be calculated, as discussed above) and the raw trailer angle signal determined by the hitch angle sensor 44 by the image of trailer 12 including target 52.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A backup assist system for a vehicle and trailer combination, comprising:
   a vehicle steering system;
   a camera generating images of the trailer; and
   a controller:
      processing sequential images of the trailer during a straight driving interval;
      selecting a baseline image corresponding with a determined steady-state condition;
      determining a vehicle-trailer collision angle based on a location of a feature of the trailer in the baseline image; and
      controlling the steering system to maintain a hitch angle at or below a maximum controllable angle or below the collision angle, whichever is lesser.

2. The system of claim 1, wherein the controller further determines the hitch angle by comparing an instantaneous one of the sequential images and the baseline image.

3. The system of claim 1, wherein the camera is mounted on the vehicle facing toward the trailer.

4. The system of claim 1, wherein the maximum controllable angle is determined by the controller using a kinematic model of the vehicle and trailer combination.

5. The system of claim 1, wherein the collision angle is based on an angle between the feature of the trailer and an adjacent corner of the vehicle.

6. The system of claim 5, wherein the collision angle further includes a safety angle added to the angle between the feature of the trailer and the adjacent corner of the vehicle.

7. The system of claim 5, wherein the feature is a checkered target.

8. The system of claim 7, wherein:
   the vehicle defines a first distance from a trailer hitch with which the trailer is coupled to an adjacent corner of the vehicle; and
   wherein the target is positioned on the trailer at a second distance from the trailer hitch approximately equal to the first distance.

9. The system of claim 1, wherein the controller further prompts a user to drive the vehicle and trailer combination along a straight path in a forward direction prior to selecting the baseline image.

10. A vehicle, comprising:
a steering system;
a camera generating images of a predetermined area to a rear of the vehicle; and
a system for assisting in reversing the vehicle with a trailer coupled therewith and including a controller:
processing sequential images received from the camera during a straight driving interval;
selecting a baseline image of the trailer, including a locating feature, corresponding with a determined steady-state condition;
determining a vehicle-trailer collision angle based on a location of the feature in the baseline image; and
controlling the steering system to maintain a hitch angle at or below a maximum controllable angle or below the collision angle, whichever is lesser.

11. The vehicle of claim 10, wherein controlling the controller further determines the hitch angle by comparing an instantaneous one of the sequential images and the baseline image.

12. The vehicle of claim 10, wherein the camera is mounted on the vehicle facing toward the trailer.

13. The vehicle of claim 10, wherein the maximum controllable angle is determined by the controller using a kinematic model of a combination of the vehicle and the trailer.

14. The vehicle of claim 10, wherein the collision angle is based on an angle between the feature of the trailer and an adjacent corner of the vehicle.

15. The vehicle of claim 14, wherein the collision angle further includes a safety angle added to the angle between the feature of the trailer and the adjacent corner of the vehicle.

16. A method for assisting a vehicle in reversing a trailer, comprising:
selecting a baseline image from a plurality of sequential images received from a camera mounted to the vehicle during a straight driving interval;
determining a vehicle-trailer collision angle based on a location of a target on the trailer in the baseline image corresponding with a determined steady-state condition; and
controlling a steering system of the vehicle to maintain a trailer hitch angle at or below a maximum controllable angle or below the collision angle, whichever is lesser.

17. The method of claim 16, wherein the hitch angle is determined by comparing an instantaneous location of the target in an instantaneous one of the sequential images and a location of the target in the baseline image.

18. The method of claim 16, wherein the maximum controllable angle is determined using a kinematic model of the vehicle and trailer combination.

19. The method of claim 16, wherein the collision angle is based on an angle between the target and an adjacent corner of the vehicle.

20. The method of claim 16, further including prompting a user to drive the vehicle along a straight path in a forward direction for one of a predetermined time interval or a predetermined distance prior to selecting the baseline image.

* * * * *